United States Patent [19]
Fink et al.

[11] 4,202,773
[45] May 13, 1980

[54] APPARATUS FOR THE DEWATERING OF SLUDGE

[75] Inventors: Eugen Fink; Peter Ostermeyer, both of München, Fed. Rep. of Germany

[73] Assignee: Krauss-Maffei Aktiengesellschaft, München, Fed. Rep. of Germany

[21] Appl. No.: 897,724

[22] Filed: Apr. 19, 1978

[30] Foreign Application Priority Data

Apr. 27, 1977 [DE] Fed. Rep. of Germany ....... 2718673

[51] Int. Cl.$^2$ .............................................. B04B 3/04
[52] U.S. Cl. .................................. 210/256; 210/374; 210/403; 100/117; 100/146
[58] Field of Search ............... 210/256, 261, 374, 377, 210/380 H, 375, 394, 402, 403, 225; 233/7; 100/146, 145, 117

[56] References Cited

U.S. PATENT DOCUMENTS

| | | | |
|---|---|---|---|
| 3,437,209 | 4/1969 | Evans | 210/374 |
| 3,658,182 | 4/1972 | Bye-Jorgensen et al. | 210/374 |
| 3,938,434 | 2/1976 | Cox | 210/225 |
| 4,062,776 | 12/1977 | Blok | 210/403 |

FOREIGN PATENT DOCUMENTS

| | | | |
|---|---|---|---|
| 505207 | 8/1951 | Belgium | 100/145 |
| 976357 | 7/1963 | Fed. Rep. of Germany. | |
| 2617179 | 11/1976 | Fed. Rep. of Germany. | |

*Primary Examiner*—Benoit Castel
*Attorney, Agent, or Firm*—Karl F. Ross

[57] ABSTRACT

Clarifier sludge is dewatered to a relatively low residual moisture content by passing it axially in one direction through an inner centrifuge drum in which initial dewatering takes place in a first centrifugal force field. Immediately thereafter the solids phase is introduced into an outer second drum having a diameter approximately twice that of the first and in which the solids are subjected to a centrifugal force field about twice as great as the first force field. In each drum the solids are displaced by wipers or scrapers (strippers) preferably of the worm type and the liquid is drawn from the drum at the opposite axial end from that at which the solids are removed.

9 Claims, 1 Drawing Figure

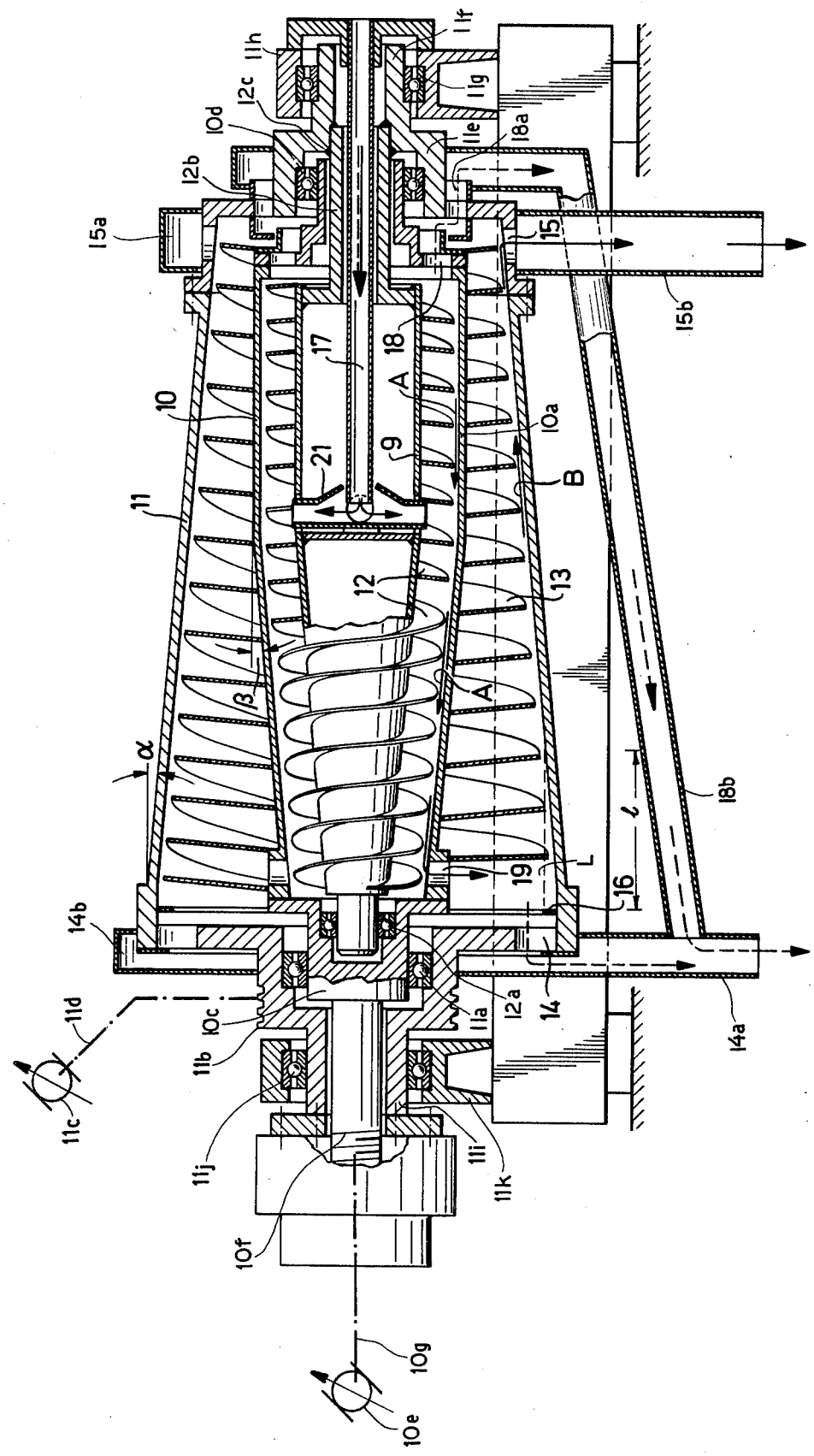

APPARATUS FOR THE DEWATERING OF SLUDGE

FIELD OF THE INVENTION

The present invention relates to an apparatus for the dewatering of sludge in a centrifugal-force field and, more particularly, to improvements in the dewatering of sludge in which the latter is preseparated in a first stage from the water which is decanted and is then after dried in a second centrifugal-force field.

BACKGROUND OF THE INVENTION

It is known to provide a process for the dewatering of sludge in a centrifugal-force field whereby, in a first operating phase, the sludge is predried in a first force field in which the water is decanted from the solids and directly thereafter is subjected in a second working phase to a second force field serving to after dry the sludge. Apparatus for this purpose is also known and can use dewatering or sludge-concentrating or separating drums.

For example, German open application (Offenlegungsschrift) DT-OS No. 2 617 179 described an apparatus for this purpose in which the sludge and the liquid are passed through an outer drum in the same direction. In a second phase, i.e. in a second drum, the sludge is concentrated.

Another system for this purpose is described in German patent No. 976 357. In this system, an inner unperforated drum serves for preclarifying of the sludge and a disk serves as a weir over which the liquid flows and which is provided with bores through which the separated solids are removed. Outside of this disk, a worm is provided to advance the sludge and discharge the latter. This discharge worm cooperates with an outer unperforated drum to carry the solids in the direction of the narrow end of the drum. Both drums are freely rotatable relative to one another and are driven with different angular velocities. In a preferred embodiment of this prior art system, the outer drum serves for after drying the solids displaced thereto by the discharge worm and is surrounded by a perforated drum.

Both of these conventional systems have a common disadvantage, namely, that they yield a sludge product having a high residual moisture content.

Decanting centrifuges operating in the aforedescribed manner for sludge dewatering have thus far proved to be unsatisfactory in many cases because decanting centrifuges yield a solid product whose residual moisture is unsatisfactory by comparison with dewatering systems using filter-band presses and stationary filter presses.

Investigations have already attempted to improve the effectiveness of decanting centrifuges by, for instance, a stop-and-go operation. In the stop-and-go process, the discharge worm is operated intermittently and the filling can proceed intermittently or continuously. In other words, during the discharge the apparatus can be further filled or feed of the sludge can be terminated.

The use of a perforated drum for after drying as described, for instance, in the aforementioned German patent No. 976 357, has been found to be especially ineffective for clarifier sludge since, even after a brief period of operation, a relatively dense zone of solids is formed and the liquid can no longer be forced through this zone. Thus, as soon as a dense zone of the aforedescribed type is formed, dewatering practically ceases and it is impossible to obtain a further reduction in the residual moisture content.

OBJECT OF THE INVENTION

It is the object of the invention to provide an improved apparatus for the aforedescribed purposes, especially for the dewatering of sludge and especially clarifier sludge, which will yield a solids product of especially low moisture content.

SUMMARY OF THE INVENTION

This object and others which will become apparent hereinafter are attained, in accordance with the present invention, in a system whereby, in the second working phase, the sludge is dewatered outside the liquid level. The residence time in the second working phase is substantially greater than in the first working phase and the centrifugal force in the second working phase is at least about twice as high as that in the first working phase.

In practice it has been found that the residual moisture reduction as a function of the C-value (centrifugal force) approaches a limit asymptotically. Nevertheless, tests have shown that excellent results are attained when the C-value in the second working phase is approximately twice the C-value of the first working phase.

Subject to the improved conditions described in accordance with the present inventive apparatus, a method for dewatering the sludge comprises subjecting the sludge during the first working phase to a first centrifugal-force field to effect a predrying and directly thereafter subjecting the solid phase removed from the first stage to a second phase in which the centrifugal-force field is substantially higher than that of the first force field, i.e. approximately double, with the second centrifugal-force field resulting in an after drying of the sludge. The sludge is displaced through the centrifugal-force field transversely to the direction of acceleration from an inlet side to an outlet side while the liquid at least in the second phase is discharged in a direction opposite the direction in which the sludge is displaced.

From the apparatus point of view, the system of the present invention comprises two coaxial and at least partly conical drums each of which is provided with a rotatable screw-shaped device for advancing the solids along the respective drum. After the stream of material, i.e. the sludge to be dewatered which is a mixture of the liquid and solid phases, traverses the first drum at least part of the material stream including most of the solids is delivered to the larger-diameter second drum which is provided with an outlet for the separated liquid at the end of the second drum at which the material stream enters the latter. An outlet for the dewatered sludge is provided at the opposite end of the second drum.

Advantageously, the system is constructed and operated so that the residence time of the solids in the second phase is approximately three to five times the residence time of the material in the first phase. Depending upon the ability to dewater the sludge, higher residence times can be provided in the second phase as required.

A further reduction in the residual moisture content can be attained if, according to a further feature of the invention, toward the end of the first phase the sludge is dewatered outside the body of liquid.

An apparatus for carrying out the present invention can have the diameter of the second drum at least twice as great as the diameter of the first or inner drum. The discharge means for the separated liquid can be provided at a location of such diameter that the sludge is distributed in the second drum outside the liquid level which is maintained in the system.

According to yet another important feature of the invention, low shear forces are applied to the sludge suspension as a result of the reduced diameter and hence the reduced peripheral speed of the inner drum of the first phase. Thus the stresses upon the sludge flocculate which would otherwise be mechanically applied are reduced to a minimum. This permits the throughput to be increased, the quantity of flocculating agent to be increased and/or the requirement for flocculating agent to be decreased.

It has been found to be advantageous, as noted previously, to provide the two drums inside one another although it is also possible to carry out the process with an apparatus in which the two drums are disposed end-to-end or one behind the other.

The system of the present invention has the surprising advantage that it allows a dewatering of the sludge to a significantly higher degree than earlier drum-type decantation techniques. The sedimentation-decantation process of the present invention, for example, permits reduction of the residual moisture from a level of about 77% in the case of the prior art to no more than 70% even where sludges are handled which are generally considered to be difficult to dewater.

It should be noted in this connection that a further reduction in the residual moisture content may result in the sludge becoming difficult or impossible to pump or displace and thus may not be desirable. A key aspect of the invention is that it allows with extremely simple mechanical elements the reduction of the moisture content of sludge to an optimum level in a field in which even a reduction in the residual moisture content of a few percent is a significant advance.

The system of the present invention can also be operated with the stop-and-go process previously mentioned.

It should be noted, further, that the improvement in reducing the residual moisture content is in part a result of the increased C-value of the after drying phase for a given centrifuge period but is also a function of the residence time of the solids in the centrifuge. With the system of the present invention, both the C-value and the residence time are increased by carrying out the second phase in a second drum coaxial with the first and of a substantially larger diameter. It is significant that the after drying second phase operation is effected outside the liquid level of the apparatus.

BRIEF DESCRIPTION OF THE DRAWING

The above and other objects, features and advantages of the present invention will become more readily apparent from the following description, reference being made to the accompanying drawing in which the sole FIGURE is an axial cross-sectional view through an apparatus according to the present invention.

SPECIFIC DESCRIPTION

The decanting centrifuge of the present invention comprises a first drum 10 (inner drum) and a second drum 11, each of which cooperates with a screw-like stripper arrangement 12 or 13, respectively. In other words, in each of the drums a respective worm stripper 12 or 13 is rotatable.

The drum 10 has a cylindrical distributing section 10a and a frustoconically converging discharge section 10b while the drum 11 is frustoconical practically over the entire length.

The inner worm 12 is journaled at 12a in a bearing of a shaft 10c fixed to the drum 10 and journaled, in turn, in a bearing 11a of the outer drum 11. The outer drum is driven by a V-belt pulley 11b connected by V-belts to a motor represented diagrammatically at 11c as signified by the dot-dash line 11d.

At its opposite end, the drum 10 is journaled in a bearing 10d in a bushing 11e connected to the outer drum. The bushing 11e is, in turn, formed with a hollow shaft 11f which is journaled at 11g in a journal block 11h connected to the base 30 of the apparatus. The V-belt pulley 11b is provided with a shaft 11i which is journaled at 11j in a bearing secured in the journal block 11k also mounted on the support 30.

The worm 12 is provided with a shaft 12b which is welded at 12c to the sleeve 12e so that the worm 12 is coupled with the inner drum 10. The outer worm 13 is, in turn, mounted on the periphery of the inner drum 10 so as to be rotatable therewith.

The inner drum 10 is provided with a drive motor 10e which is coupled to the inner drum via a shaft 10f as represented by the dot-dash line 10g.

The sludge is introduced into the apparatus by a hollow shaft 17 and is fed radially outwardly by a distributor 21 into the inner drum 10 substantially at the junction between the cylindrical and conical sections 10a and 10b, respectively. The hollow shaft 17 extends along the common axis of rotation of the two drums 10 and 11.

In general, the stripper worms 12 and 13 are rotated at different speeds. As has been indicated, the stripper 13 for the second drum 11 is fixed to the outer surface of the first drum 10 while the stripper worm 12 for the first drum is connected to the central shaft 9 which forms part of the worm support and is coupled via the shaft 12b to the first drum 11.

The sludge is thus displaced in the direction of arrow A along the first drum and then in the direction of arrow B along the second drum.

In the embodiment illustrated, the sludge first passes to the left along arrow A after being distributed along the inner wall of the drum 10 and is discharged radially outwardly through bores 19 at the discharge or left-hand end of the inner drum 10.

When the sludge passes onto the outer drum 11, it is displaced by the worm 13 in the opposite direction (arrow B), i.e. from left to right until it exits at the discharge bores 15. The later opens into a hood 15a surrounding the right-hand end of the drum 11. The hood is connected by a pipe 15b to a collecting tank or other processing unit, the pipe being represented at 15b.

The discharge openings for the separated liquid are, in each case, disposed at the opposite side of the respective drum from the outlets for the sludge.

Thus, in the case of the inner drum 10, the liquid outlet bores 18 open axially at the right-hand end of the drum into a labyrinth 18a from whence the liquid is carried by a pipe 18b to a further duct 14a connected to a hood 14b surrounding the left-hand end of the outer drum 11 and into which the axial openings 14 for the discharge of the liquid phase empty in turn.

The openings 18 are thus disposed at the opposite end of drum 10 from the openings 19 while the openings 14 are disposed at the opposite end of the drum 11 from the openings 15.

Advantageously, the angular velocity (rpm) difference between the stripper devices 12 and 13 and the associated drums 10 and 11 is adjustable. This may be accomplished by making one or both of the motors 10e and 11c of a variable speed type. To effect stop-and-go operation, moreover, between one of the stripper devices in the associated drum, either the drum or the stripper cooperating therewith can be intermittently stopped by deenergizing the respective motor 10e or 11c. In this case, the stripper can be entrained with the drum with which it cooperates so that they rotate in the same sense.

While it is preferred to form the stripper as conveyor worms, other rotary stripper arrangements can be used for displacing the sludge along the respective drums.

The conicity of the second drum 11 is represented by the angle $\alpha$ and amounts to about 5°. The second drum 11 is, as has been shown in the drawing, conical and unperforated over its entire length. By contrast, the first or inner drum 10 is cylindrical over its right-hand portion and only over the left-hand part has a conicity $\beta$ of about 5°. Naturally, the first drum 10 can also have a conical convergence over its entire length. Drum 10 is also unperforated.

It is significant for the present invention that the openings 14 are oriented and positioned so that they lie at the outermost portion of the outer drum 11 such that over most of the length of the drum 11 the sludge is subjected to the centrifugal-force field outside of the water level. The water level is here represented by the broken line L and is determined by a weir 16 of relatively small height. Thus the water level extends only over a limited length l of the drum inwardly of the outer wall thereof and practically all of the sludge in the second drum is exposed to the centrifugal-force field outside the liquid level. Of course, the weir 16 can be completely eliminated. However, it has been found to be desirable in some cases in order to prevent sludge from flowing through the outlet 19.

The average (mean) diameter of the second drum 11 is approximately equal to twice the outer diameter of the first drum 10. This can be sufficient to ensure that the sludge in the second drum 11 will be exposed to a substantially higher C-value (centrifugal force) and, in addition, ensure a substantially larger residence time than applies to the sludge in the inner drum.

We claim:

1. An apparatus for dewatering sludge by subjecting a flowable material-containing sludge solids and liquid to separation in a first step into a solids-containing sludge phase and a liquid phase and the sludge phase is further dewatered to separate the same into solids and liquid, said apparatus comprising:
    a first elongated imperforate drum rotatable about an axis for subjecting material on the interior of said drum to a first centrifugal force field;
    means for rotating the first drum about said axis;
    an inlet opening into said drum for distributing said flowable material onto the interior thereof;
    first stripper means cooperating with said first drum for displacing the sludge phase formed by separation of liquid phase from said flowable material along said first drum away from said inlet toward a first sludge outlet at one end of said first drum, the other end of said first drum being provided with an outlet for said liquid phase;
    a second elongated rotatable imperforate drum having a sludge inlet formed by the sludge outlet of said first drum for directly receiving the sludge phase therefrom, said second drum having a sludge outlet remote from said sludge inlet and a liquid outlet proximal to said sludge inlet, said drums being coaxial;
    means for rotating said second drum to impart to the sludge phase therein a centrifugal-force field substantially twice the amplitude of the centrifugal-force field to which the material is subjected in said first drum whereby the sludge phase is subjected to the second centrifugal-force field of said second drum substantially out of contact over at least a major portion of the length of the drum with the liquid separated from the solids in said second drum, said second drum surrounding said first drum and having an average diameter substantially twice that of the first drum, said drums conically converging in opposite directions; and
    second stripper means cooperating with said second drum for displacing solids separated from said sludge phase in the second centrifugal-force field from said sludge inlet toward said solids outlet.

2. The apparatus defined in claim 1 wherein said second drum is frustoconical over its entire length.

3. The apparatus defined in claim 2 wherein the angle of conicity of said second drum is about 5°.

4. The apparatus defined in claim 1 wherein the drums are provided with means for rotating them at different speeds.

5. The apparatus defined in claim 4 wherein the means for rotating said drums at different speeds includes means for controlling the speed of at least one of said drums.

6. The apparatus defined in claim 1 wherein said stripper means are provided with means for driving same at different speeds.

7. The apparatus defined in claim 6 wherein the means for driving said stripper means at different speeds includes means for varying the speed of at least one of said stripper means.

8. The apparatus defined in claim 1 wherein each of said stripper means is a worm.

9. The apparatus defined in claim 1 wherein:
    said first drum is cylindrical over part of its length and conically converges with a conicity angle of about 5° toward said sludge outlet;
    the inlet for said material to said first drum includes a pipe extending axially into the end of said first drum opposite the end at which said sludge outlet is provided;
    said first stripper means is a worm connected to said second drum by a hollow shaft through which said pipe extends, said hollow shaft being formed with openings for distributing the flowable material onto the interior of the first drum;
    said first drum is provided with bearings rotatably supporting the worm forming said first stripper means at least at one end thereof;
    said second drum is journaled at its opposite axial ends in a pair of bearing blocks, the liquid outlet from said second drum opening axially at the end of said second drum enclosing the sludge outlet of the first drum; and
    said second drum is conically convergent in a direction opposite the convergence of the other portion of the first drum with a conicity angle of about 5°, the second stripper means including a second worm fixed to the exterior of said first drum.

* * * * *